(12) United States Patent
Weng et al.

(10) Patent No.: US 10,316,953 B2
(45) Date of Patent: Jun. 11, 2019

(54) ASSEMBLY OF LUBRICATION SYSTEM FOR FLUID MACHINERY

(71) Applicant: INDUSTRIAL TECHNOLOGY RESEARCH INSTITUTE, Hsin-Chu (TW)

(72) Inventors: Ying-Che Weng, Zhubei (TW); Teng-Yuan Wu, Changhua (TW); Jer-Lin Huang, Hsinchu (TW); Jyh-Nan Ho, Hsinchu (TW); Chun-Hsiang Yang, Taipei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 281 days.

(21) Appl. No.: 15/379,636

(22) Filed: Dec. 15, 2016

(65) Prior Publication Data

US 2018/0128366 A1    May 10, 2018

(30) Foreign Application Priority Data

Nov. 4, 2016 (TW) .............................. 105136017 A

(51) Int. Cl.
*F16H 57/04* (2010.01)
*F16H 57/00* (2012.01)
(Continued)

(52) U.S. Cl.
CPC ..... *F16H 57/0409* (2013.01); *F16H 57/0018* (2013.01); *F16H 57/021* (2013.01);
(Continued)

(58) Field of Classification Search
CPC ............. F16H 57/0409; F16H 57/0018; F16H 57/021; F16H 57/0456; F16J 15/447
See application file for complete search history.

(56) References Cited

U.S. PATENT DOCUMENTS

| | | | |
|---|---|---|---|
| 4,997,340 A | | 3/1991 | Zinsmeyer et al. |
| 5,987,968 A | * | 11/1999 | Cook ................ F02M 25/0818 123/520 |

(Continued)

FOREIGN PATENT DOCUMENTS

| CN | 2160760 Y | 4/1994 |
|---|---|---|
| CN | 102348904 A | 2/2012 |

(Continued)

OTHER PUBLICATIONS

R.L. Judd et al., An investigation of the use of heat pipes for machine tool spindle bearing cooling, International Journal of Machine Tools and Manufacture, 1994, 1031-1043, vol. 34, No. 7.

(Continued)

*Primary Examiner* — Michael R Mansen
*Assistant Examiner* — Robert T Reese
(74) *Attorney, Agent, or Firm* — Locke Lord LLP; Tim Tingkang Xia, Esq.

(57) ABSTRACT

An assembly of a lubrication system for fluid machinery includes a transmission shaft, an oil-injection insulating ring and a labyrinth ring. The transmission shaft defines axially power and passive sides. The power side includes a body unit having first and second bearings. The oil-injection insulating ring located between the first and second bearings sleeves the transmission shaft and connects a fuel-supply looping having outer and inner rings. The outer ring has at least one first hole communicatively connected with the fuel-supply looping. The labyrinth ring having first and second axial ends has outer diameters tapering from the second axial end to the first axial end. The first and second axial ends face the power and passive sides, respectively. A circumference of the labyrinth ring includes circular grooves to form a circumferential step-like structure. The labyrinth (Continued)

ring sleeves the transmission shaft and is embedded into the body unit.

8 Claims, 4 Drawing Sheets

(51) Int. Cl.
    *F16H 57/021* (2012.01)
    *F16J 15/447* (2006.01)
(52) U.S. Cl.
    CPC ....... *F16H 57/042* (2013.01); *F16H 57/0456* (2013.01); *F16J 15/447* (2013.01)

(56) References Cited

U.S. PATENT DOCUMENTS

| | | | |
|---|---|---|---|
| 7,789,616 B2 | 9/2010 | Yen et al. | |
| 8,491,195 B2 | 7/2013 | Kobayashi et al. | |
| 8,600,707 B1* | 12/2013 | El-Aini | F01D 11/02 703/1 |
| 2004/0175065 A1* | 9/2004 | Nguyen | F16C 19/06 384/480 |
| 2007/0065276 A1* | 3/2007 | Muller | F01D 11/02 415/170.1 |
| 2008/0063331 A1 | 3/2008 | Mori et al. | |
| 2012/0301065 A1 | 11/2012 | Mori et al. | |
| 2014/0333032 A1* | 11/2014 | Kern-Trautmann | F16J 15/445 277/412 |
| 2014/0369636 A1 | 12/2014 | Tagle | |
| 2015/0159697 A1* | 6/2015 | Fischer | F16J 15/162 384/462 |
| 2015/0211639 A1* | 7/2015 | Grimanis | F16J 15/447 277/303 |
| 2016/0153497 A1* | 6/2016 | Nakai | F16J 5/3232 384/484 |

FOREIGN PATENT DOCUMENTS

| | | |
|---|---|---|
| CN | 202418511 U | 9/2012 |
| CN | 203044505 U | 7/2013 |
| CN | 203214635 U | 9/2013 |
| CN | 103452869 A | 12/2013 |
| CN | 103711879 A | 4/2014 |
| CN | 104074793 A | 10/2014 |
| CN | 204200865 U | 3/2015 |
| CN | 105003548 A | 10/2015 |
| CN | 105351366 A | 2/2016 |
| CN | 105570465 A | 5/2016 |
| JP | 2002295493 A | 10/2002 |
| JP | 2007093016 A | 4/2007 |
| JP | WO2013099748 A1 | 5/2015 |
| TW | 339135 U | 8/1998 |
| TW | I225126 B | 12/2004 |
| TW | 200535347 A | 11/2005 |
| TW | I273187 B | 2/2007 |
| TW | M307704 U | 3/2007 |
| TW | 200946792 A | 11/2009 |
| TW | M385686 U | 8/2010 |
| TW | 201122289 A | 7/2011 |
| TW | I345355 B | 7/2011 |
| TW | 201335500 A | 9/2013 |
| TW | I425148 B | 2/2014 |
| TW | I432648 B | 4/2014 |
| TW | 201424212 A | 6/2014 |
| TW | I447302 B | 8/2014 |
| TW | I484733 B | 5/2015 |
| TW | I505115 B | 10/2015 |
| TW | I516967 B | 1/2016 |
| TW | I553228 B | 10/2016 |

OTHER PUBLICATIONS

Sun-Min Kim et al., Effect of bearing support structure on the high-speed spindle bearing compliance, International Journal of Machine Tools and Manufacture, 2002, 365-373, 42.

Bachir Bouchehit et al., Static and dynamic performances of refrigerant-lubricated bearings, Tribology International, 2016, 326-348, 96.

Jhe-Yuan Jhang et al., Thermal effects on elastohydrodynamic lubrication properties under lubricant starvation, Department of Mechanical and Electro-Mechanical Engineering National Sun Yat-sen University Master Thesis, 2013.

Sheng-Jie Chen et al., Hydrodynamic Lubrication Analysis of Herringbone-Grooved Journal Bearing, Department of Mechanical and Electro-Mechanical Engineering National Sun Yat-sen University Master Thesis, 2015.

Ke Yan et al., Thermal-deformation coupling in thermal network for transient analysis of spindle-bearing system, International Journal of Thermal Sciences, 2016, 1-12, 104.

Taiwan Intellectual Property Office, Ministry of Economic Affairs R.O.C., "Office Action", dated Jun. 7, 2017.

* cited by examiner

ASSEMBLY OF LUBRICATION SYSTEM FOR FLUID MACHINERY

CROSS REFERENCE TO RELATED APPLICATION

The present application is based on, and claims priority from, Taiwan (International) Application Serial Number 105136017, filed on Nov. 4, 2016, the disclosure of which is hereby incorporated by reference herein in its entirety.

TECHNICAL FIELD

The present disclosure relates to an assembly of a lubrication system for fluid machinery.

BACKGROUND

Typical oil operation mechanism of a conventional bearing seal assembly generally includes: a step of a lubrication system supplying lubricating oil; a step of a transmission shaft rotating an oil slinger at a high speed to spin off excessive lubricating oil in a tangential direction, and a step of an upper oil-return passage and a lower oil-return passage of an oil tank collecting the recessive lubricating oil. In the conventional bearing seal assembly, a spaced ring is applied to inhibit possible friction caused by an identical element contacting both an inner ring and an outer ring of a bearing, and a pressure ring is applied to position the bearing. In addition, while the excessive lubricating oil diffuses toward a passive side (i.e. the impeller side), a slinger groove of the transmission shaft would serve as a first stage of oil-blocking means. Also, a labyrinth ring is used as an oil seal.

In a positive pressure (i.e. air-blowing) condition, the air flow is pushed from the passive side to the power side (i.e. the motor side interior to the bearing seal assembly), such that the sealing components can be further depressed to avoid possible oil leakage. However, as soon as the pressure shifted from the positive pressure into a vacuum, the pushing of the air flow will be reversed to form a pulling force from toward the passive side (i.e. exterior to the bearing seal assembly). Thereupon, the lubricating oil would leak to the passive side (i.e. the impeller side), and thus the work fluid in the passive side would be contaminated. This is the reason why the oil-sealing ability of the conventional bearing seal assembly is not satisfied.

Therefore, the topic how to provide an improvement good at sealing, air-exhausting, oil-collecting, oil-slingering, oil-supplying and oil-returning so as to achieve fluent flows of the lubricating oil, effective leakage inhibition and better positive/vacuum pressure working conditions in an assembly of a lubrication system for fluid machinery is definitely urgent to the art.

SUMMARY

In one embodiment of this disclosure, an assembly of a lubrication system for fluid machinery includes:

a transmission shaft, defining opposing axial ends to a power side and a passive side, the power side having a body unit further including thereinside a first bearing and a second bearing;

an oil-injection insulating ring, sleeving the transmission shaft, located between the first bearing and the second bearing, connecting communicatively a fuel-supply looping, including an outer ring and an inner ring, the outer ring further having at least one first hole communicatively connected with the fuel-supply looping; and a labyrinth ring, having a first axial end and a second axial end opposing axially to the first axial end, outer diameters thereof being tapered from the second axial end to the first axial end, the first axial end facing the power side while the second axial end faces the passive side, a circumference thereof connecting the first axial end and the second axial end and including a plurality of circular grooves so as to form a circumferential step-like structure, wherein the labyrinth ring is to sleeve the transmission shaft and to be embedded into the body unit.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
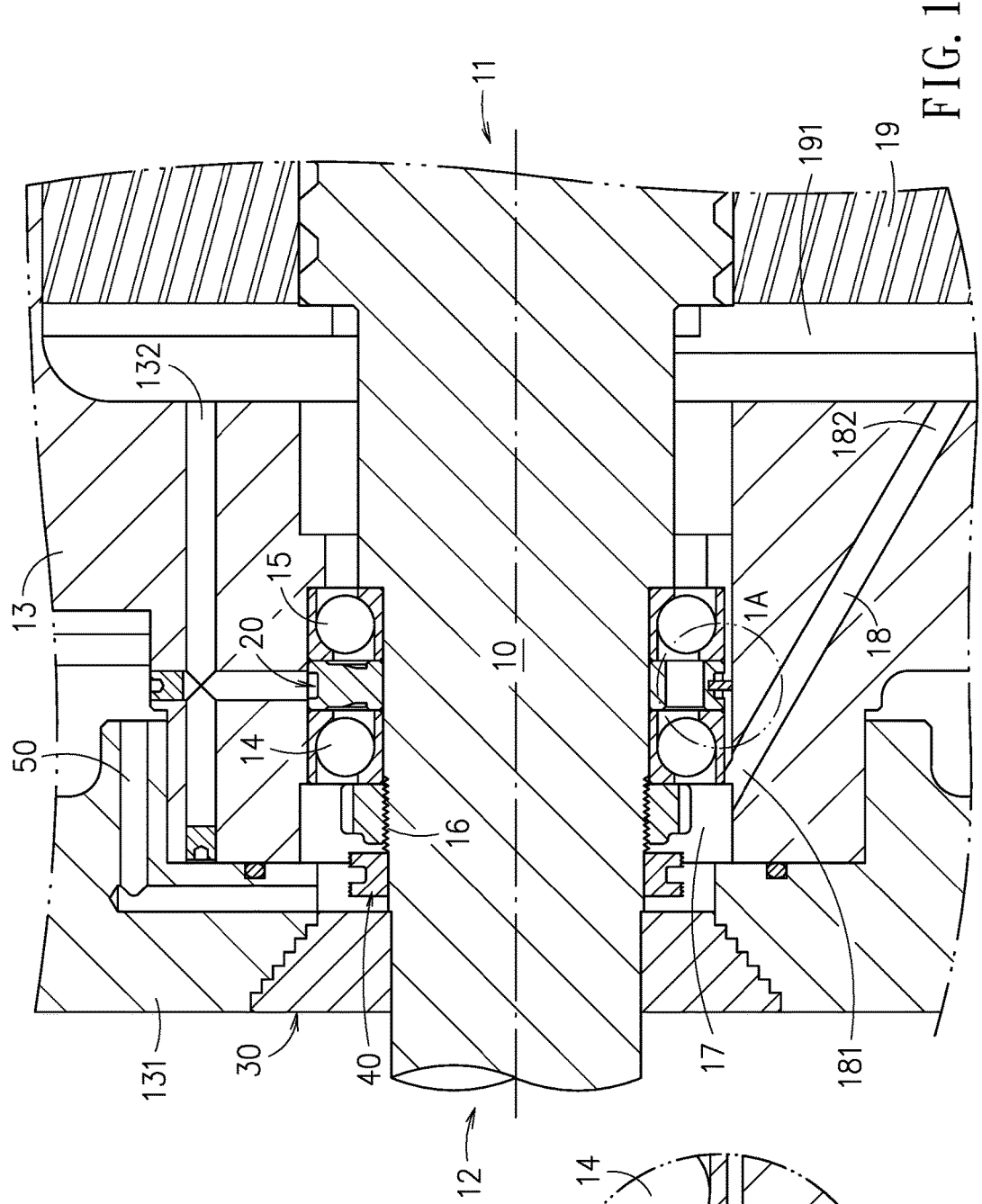
FIG. 1 is a schematic cross-sectional view of an embodiment of a assembly of a lubrication system in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, the assembly of the lubrication system for fluid machinery includes a transmission shaft 10, an oil-injection insulating ring 20, a labyrinth ring 30, an oil slinger 40 and an exhaust passage 50.

With respect to the transmission shaft 10, the assembly has a power side 11 and a passive side 12 defined to opposing axial ends thereof. In the power side 11, a body unit 13 is included, and the body unit 13 further has a volute cover 131. Inside the body unit 13, a first bearing 14 and a second bearing 15 are located in order to sleeve the transmission shaft 10. The power side 11 connected to a power source (a motor for example, but not shown in the figure) is to drive the transmission shaft 10 and components (gears for example) inside the body unit 13. When the transmission shaft 10 rotates, passive members (the impeller for example) in the passive side 12 would be driven to rotate as well.

Figure 3:
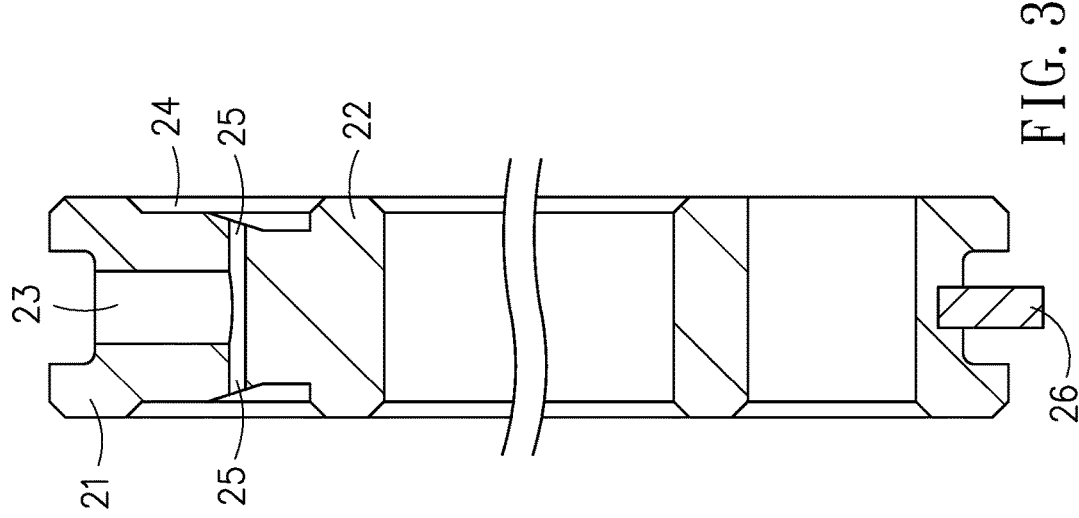
FIG. 3 is a schematic cross-sectional view of FIG. 2 along line A-A.
Figure 2:
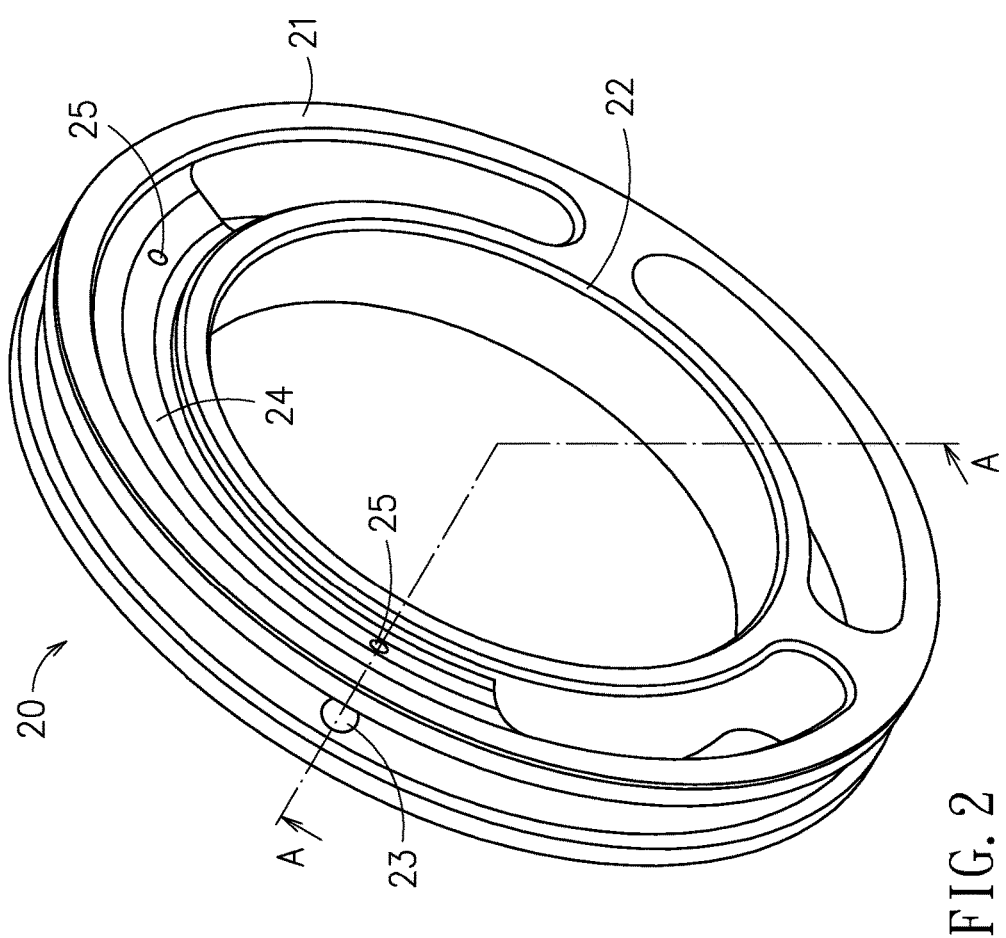
FIG. 2 is a schematic perspective view of the oil-injection insulating ring of FIG. 1.

Referring now from FIG. 1 to FIG. 3, the oil-injection insulating ring 20 is to sleeve the transmission shaft 10 at a position between the first bearing 14 and the second bearing 15, and to connect communicatively a fuel-supply looping 132. The oil-injection insulating ring 20 is mainly consisted of an outer ring 21 and an inner ring 22, in which the outer ring 21 further has at least one first hole 23 communicatively connected with the fuel-supply looping 132. In each of two opposing lateral sides of the oil-injection insulating ring 20, an arcuate recess 24 is formed between the outer ring 21 and the inner ring 22, by having a center of the arcuate recess 24 to be concentric with the oil-injection insulating ring 20. The arcuate recess 24 has at least one second hole 25 (two shown in the figure) to communicate spatially with the at least one first hole 23. Also, the second hole 25 at one side of the oil-injection insulating ring 20 is communicate spatially with the corresponding second hole 25 at the other side of the oil-injection insulating ring 20. Namely, the first hole 23 is constructed to go deep into the oil-injection insulating ring 20 so as to connect the corresponding second holes 25 at both sides of the oil-injection insulating ring 20. Thereupon, the lubricating oil in the fuel-supply looping 132 would enter the first hole 23, then flow to the opposing sides of the oil-injection insulating ring 20 through the corresponding second holes 25, and thus lubricate the first bearing 14 and the second bearing 15 located to opposing sides of the oil-injection insulating ring 20. In addition, the oil-injection insulating ring 20 includes a locating pin 26 for engaging a casing 133 in the power side 11. As shown in FIG. 1 through FIG. 3, preferably, the locating pin 26 is protrusive radially from the outer ring 21 of the oil-injection insulating ring 20. By having the oil-injection insulating ring 20 to be made integrally as a unique piece, by having the inner ring 22 as a spaced ring between the first bearing 14 and the second bearing 15, and by having the outer ring 21 as an oil-injection ring, then positioning verticality and parallelism can be ensured, and also the accuracy of components for sealing can be enhanced.

Figure 5:
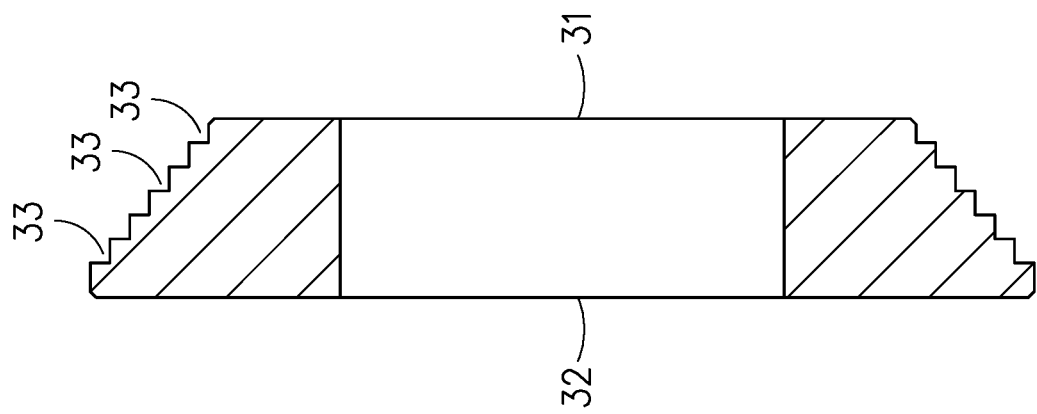
FIG. 5 is a schematic cross-sectional view of FIG. 4 along line B-B.
Figure 4:
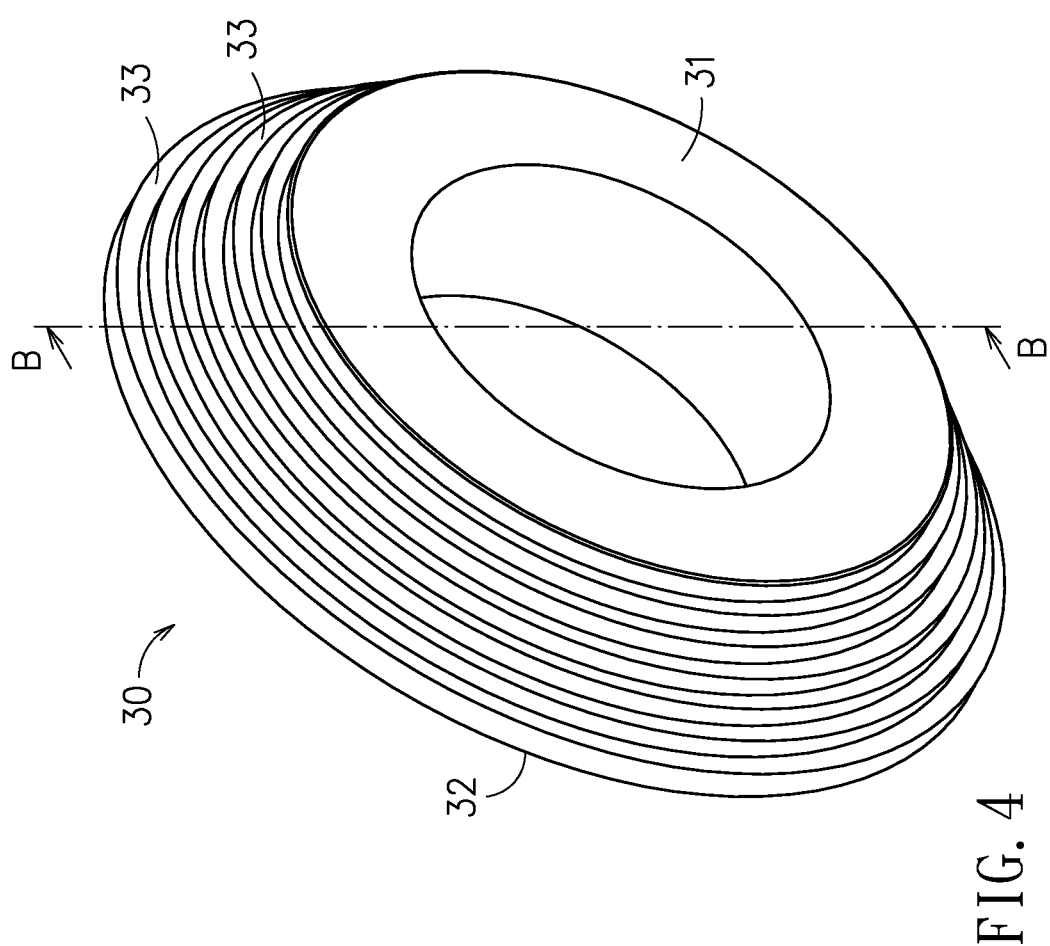
FIG. 4 is a schematic perspective view of the labyrinth ring of FIG. 1.

Referring now to FIG. 1, FIG. 4 and FIG. 5, the labyrinth ring 30 has a first axial end 31 and a second axial end 32 opposing axially to the first axial end 31. The first axial end 31 is facing the power side 11, while the second axial end 32 is facing the passive side 12. Outer diameters of the labyrinth ring 30 is tapered from the second axial end 32 to the first axial end 31. A circumference of the labyrinth ring 30 connecting the first axial end 31 and the second axial end 32 includes a plurality of circular grooves 33 so as to form a circumferential step-like structure. The labyrinth ring 30 is to sleeve the transmission shaft 10 and to be embedded into the volute cover 131. In this embodiment, the labyrinth ring 30 includes, but not limited to, six circular grooves 33 so as to form circumferential step-like structure having at least three stages. On the other hand, the volute cover 131 shall be formed to have a counter structure for engaging the circumferential step-like structure of the labyrinth ring 30. By having the tapering and step-like labyrinth ring 30, leakage resistance (or flow resistance) can be significantly improved.

Figure 7:
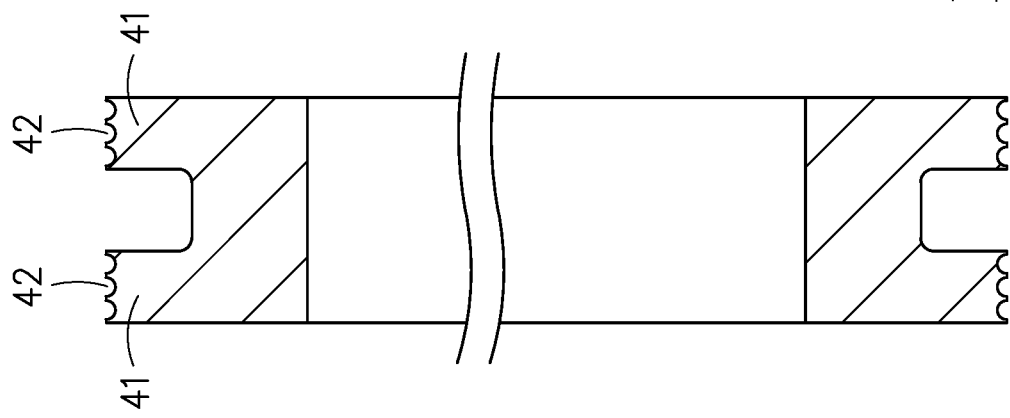
FIG. 7 is a schematic cross-sectional view of FIG. 6 along line C-C.
Figure 6:
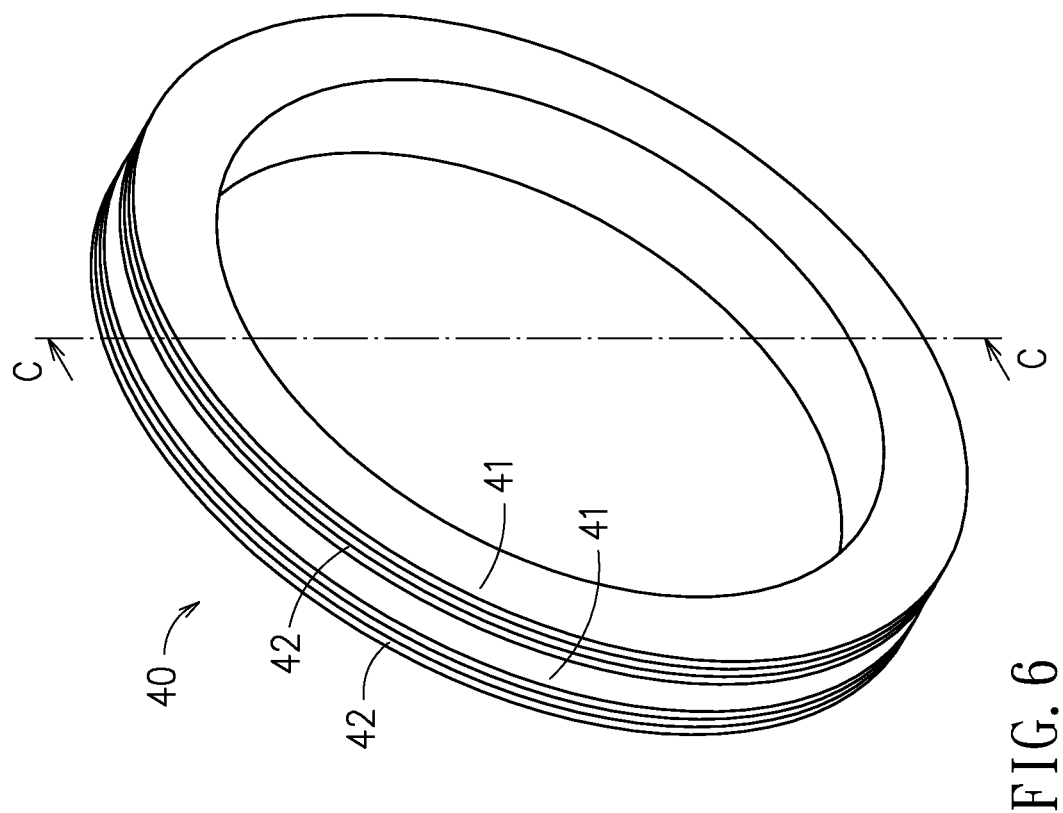
FIG. 6 is a schematic perspective view of the oil slinger of FIG. 1.

Referring now to FIG. 1, FIG. 6 and FIG. 7, the oil slinger 40 located between the oil-injection insulating ring 20 and the labyrinth ring 30 is to sleeve the transmission shaft 10. In this embodiment, as shown in FIG. 1, a plurality of oil grooves 16 are formed to surround the transmission shaft 10, with the oil slinger 40 to be positioned between the oil grooves 16 and the labyrinth ring 30. As shown in FIG. 6 and FIG. 7, the oil slinger 40 includes two separate circular flanges 41 extending radially and outwards. At each of free radial ends of the respective circular flanges 41 further has a plurality circular grooves 42. Besides, in an embodiment not shown herein, the oil slinger 40 may include only one circular flange 41, located radially at the left side, the middle or the right side of the circumference of the oil slinger 40.

As shown in FIG. 1, the exhaust passage 50 is constructed inside the volute cover 131, and a first space 17 is formed between the oil-injection insulating ring 20 and the labyrinth ring 30. One end of the exhaust passage 50 is connected spatially with the first space 17, while another end thereof is connected to the atmosphere, i.e. out of the body unit 13. As a phase change of the lubricating oil, caused by the heat generated from high-speed rotation of the transmission shaft 10, occurs, the induced oil gas would increase an internal pressure of the lubrication system. At this time, the existence of the exhaust passage 50 would serve to release the excessive internal pressure in time, such that the continuing leakage of the lubricating oil toward the passive side 12 (the impeller for example) would be prohibited. Namely, axial oil leakage can be prevented so as to ensure the sealing.

Figure 1A:
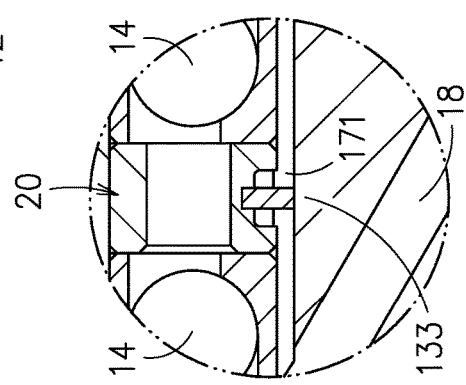
FIG. 1A is an enlarged view of area 1A of FIG. 1.

In addition, the body unit 13 further includes an oil-return line 18 having a first end 181 and a second end 182 opposing to the first end 181. As shown in FIG. 1 and FIG. 1A, the first end 181, the first space 17 and the second space 171 locating the oil-injection insulating ring 20 are all connected spatially. On the other hand, the second end 182 is connected spatially with the third space 191 of the body unit 13 where the gearbox 19 is located. In this embodiment, the first space 17 and the second space 171 are connected spatially as well.

In summary, referring to FIG. 1 again, in the assembly of the lubrication system for fluid machinery in this disclosure, after the lubricating oil enters the fuel-supply looping 132, the integrated oil-injection insulating ring 20 would provide spacing to separate the first bearing 14 and the second bearing 15, and would also perform the oil-injection. Then, excessive lubricating oil in the first space 17 and the second space 171 would flow into the oil-return line 18 for recycling. Further, the integrated oil slinger 40 would serve the oil collecting and slingering, so that the active oil-return capability can be significantly increased. In addition, the tapered labyrinth ring 30 would increase flow resistance, reduce oil leakage, provide easy assembling, and enhance assembling accuracy. Furthermore, by having the exhaust passage 50 to discharge the oil gas vaporized from the lubricating oil under high-speed rotation, possible axial oil leakage can be avoided. Upon such an arrangement, the improvement for the lubrication system in sealing, air-exhausting, oil-collecting, oil-slingering, oil-supplying and oil-returning so as to achieve fluent flows of the lubricating oil, effective leakage inhibition and better positive/vacuum pressure working conditions can successfully resolve the aforesaid shortcomings of the conventional bearing seal system.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An assembly of a lubrication system for fluid machinery, comprising:
   a transmission shaft, defining opposing axial ends to a power side and a passive side, the power side having a body unit further including thereinside a first bearing and a second bearing;
   an oil-injection insulating ring, sleeving the transmission shaft, located between the first bearing and the second bearing, connecting communicatively a fuel-supply looping, including an outer ring and an inner ring, the outer ring further having at least one first hole communicatively connected with the fuel-supply looping; and
   a labyrinth ring, having a first axial end and a second axial end opposing axially to the first axial end, outer diameters thereof being tapered from the second axial end to the first axial end, the first axial end facing the power side while the second axial end faces the passive side, a circumferential surface thereof connecting the first axial end and the second axial end and including a plurality of circular grooves so as to form a circumferential step-like structure having at least three stages, wherein the labyrinth ring is to sleeve the transmission shaft and to be embedded into a volute cover of the body unit, and wherein the volute cover is formed to have a counter structure for engaging the circumferential step-like structure of the labyrinth ring,
   wherein the body unit includes an exhaust passage, a first space is formed between the oil-injection insulating ring and the labyrinth ring, and one end of the exhaust passage is connected spatially with the first space while another end thereof is connected spatially to the atmosphere.

2. The assembly of a lubrication system for fluid machinery of claim 1, wherein the oil-injection insulating ring includes a locating pin for engaging a casing in the power side.

3. The assembly of a lubrication system for fluid machinery of claim 1, wherein, in each of two opposing lateral sides of the oil-injection insulating ring, an arcuate recess is formed between the outer ring and the inner ring by having a center of the arcuate recess to be concentric with the oil-injection insulating ring, the arcuate recess further having at least one second hole to communicate spatially with the at least one first hole.

4. The assembly of a lubrication system for fluid machinery of claim 1, further including an oil slinger located between the oil-injection insulating ring and the labyrinth ring, the oil slinger sleeving transmission shaft and including at least one circular flange extending radially and outwards.

5. The assembly of a lubrication system for fluid machinery of claim 4, wherein a free radial end of the at least one circular flange further has a plurality circular grooves.

6. The assembly of a lubrication system for fluid machinery of claim 4, further including a plurality of oil grooves located on the transmission shaft by a surrounding manner, wherein the oil slinger is positioned between the plurality of oil grooves and the labyrinth ring.

7. The assembly of a lubrication system for fluid machinery of claim 1, wherein the body unit includes an oil-return line having a first end and a second end opposing to the first end; the first end, the first space being connected spatially with the second space, the second end being connected spatially with a third space of the body unit where the gearbox is located.

8. The assembly of a lubrication system for fluid machinery of claim 7, wherein the first end is connected spatially with the second space locating the oil-injection insulating ring.

* * * * *